May 22, 1934.  D. E. GRAY  1,960,151
GAUGING GLASS ARTICLES
Filed Jan. 4, 1930   4 Sheets-Sheet 1

INVENTOR
DAVID E. GRAY.
BY
ATTORNEYS.

May 22, 1934. D. E. GRAY 1,960,151
GAUGING GLASS ARTICLES
Filed Jan. 4, 1930 4 Sheets-Sheet 2

INVENTOR
DAVID E. GRAY.
BY
ATTORNEYS.

May 22, 1934.  D. E. GRAY  1,960,151
GAUGING GLASS ARTICLES
Filed Jan. 4, 1930  4 Sheets-Sheet 3

INVENTOR
DAVID E. GRAY.
BY
ATTORNEYS.

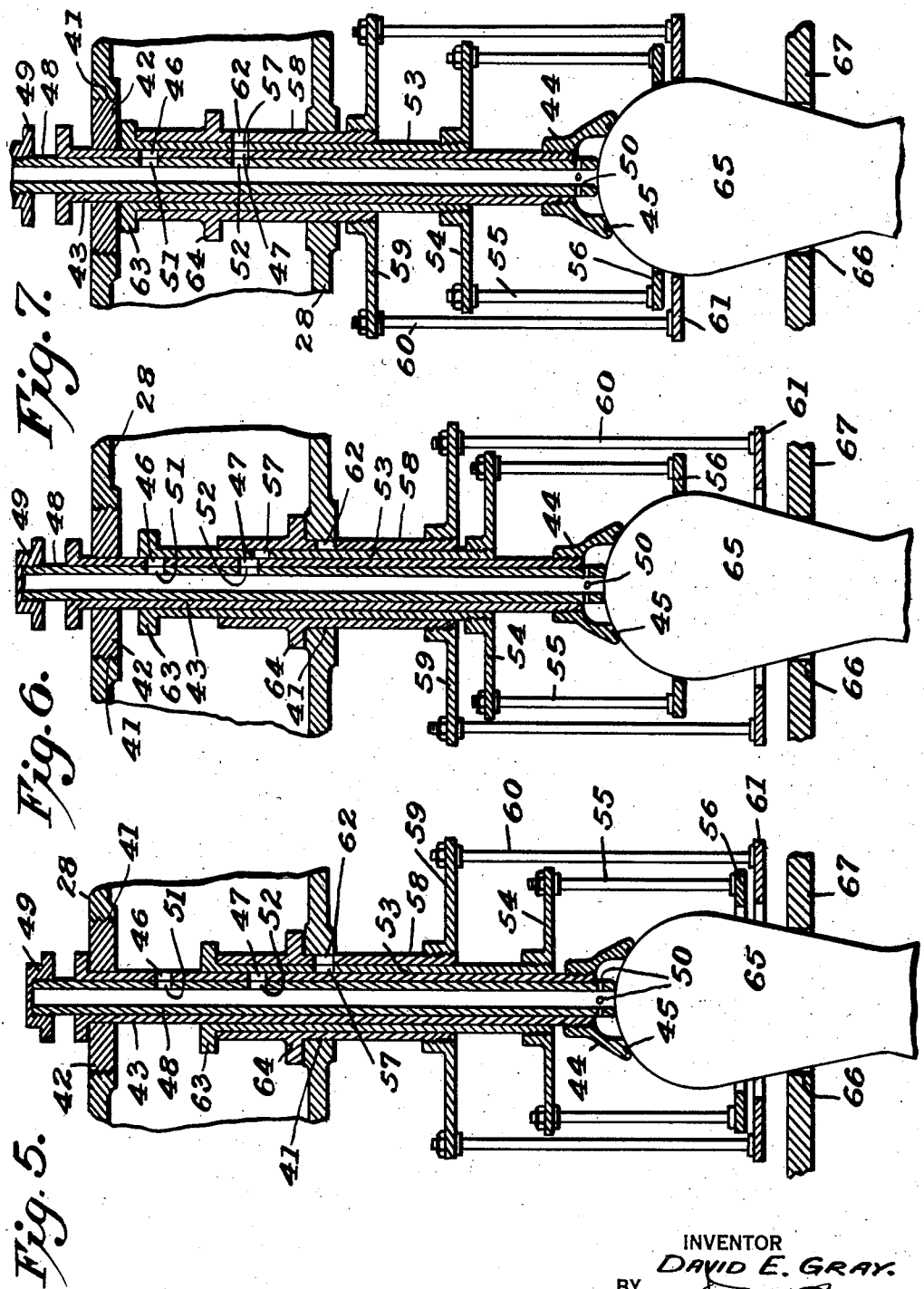

Patented May 22, 1934

1,960,151

UNITED STATES PATENT OFFICE 1,960,151

GAUGING GLASS ARTICLES

David E. Gray, Corning, N. Y., assignor to Corning Glass Works, Corning, N. Y., a corporation of New York Application January 4, 1930, Serial No. 418,610

11 Claims. (Cl. 209—80)

This invention relates to gauging glass articles, and more particularly to a means for gauging lamp bulbs.

The object of the present invention is to rapidly and accurately gauge and segregate those articles which are of irregular size and shape from those of standard size and shape.

Another object is to deposit the irregular articles in a suitable cullet receptacle for remelting.

Among its features the invention embodies an article retaining member having article engaging members associated therewith, certain of which render the article retaining member operative when an article of irregular size and shape is presented to it, while others of said article engaging members render the article retaining members inoperative if a presented article conforms to a predetermined size and shape. The embodiments include mechanism necessary for the presentation of articles in the retaining member and the necessary means for releasing retained articles before the next successive article is presented to the article retaining member.

In carrying the invention into practice, I preferably employ a pair of track rails, certain sections of which are designed to be elevated. These track rails are arranged in spaced parallel relation and form supports and guides for trays in which the articles to be gauged are carried. Supported above the movable sections of the track rails are gauges, each of which is provided with a vacuum cup. These gauges are so designed that when irregular articles are presented to them their respective vacuum cups will be evacuated so as to hold the articles against the force of gravity. Thus it will be seen that when the tray carrying the regular articles is lowered away from the gauges and moved along the trackways, those articles having irregularities will be left suspended in the gauges. After the passage of the tray from the zone beneath the gauges, the irregular articles are released and fall into a cullet receptacle positioned directly below the gauges.

In the drawings:

Fig. 5 is a view similar to Fig. 4 showing the relative position of the parts when an undersized article enters it;

Fig. 6 is a view similar to Fig. 4 showing the relative position of the parts when a standard sized article enters it; and Fig. 7 is a view similar to Fig. 4 showing the relative position of the parts when an oversized or an out-of-round article enters it.

Figure 1:
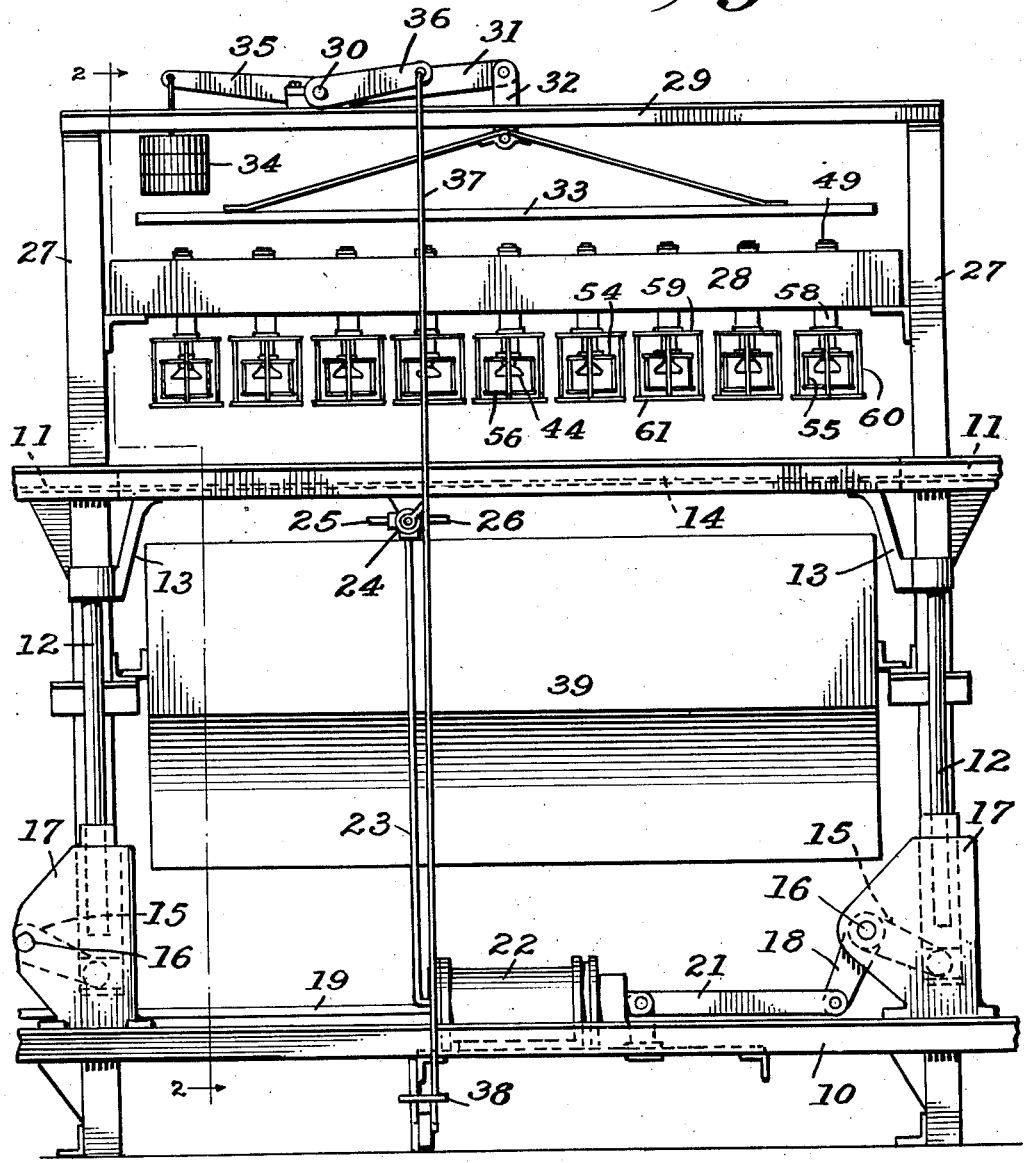
Fig. 1 is a front view of a gauging apparatus constructed in accordance with this invention.
Figure 2:
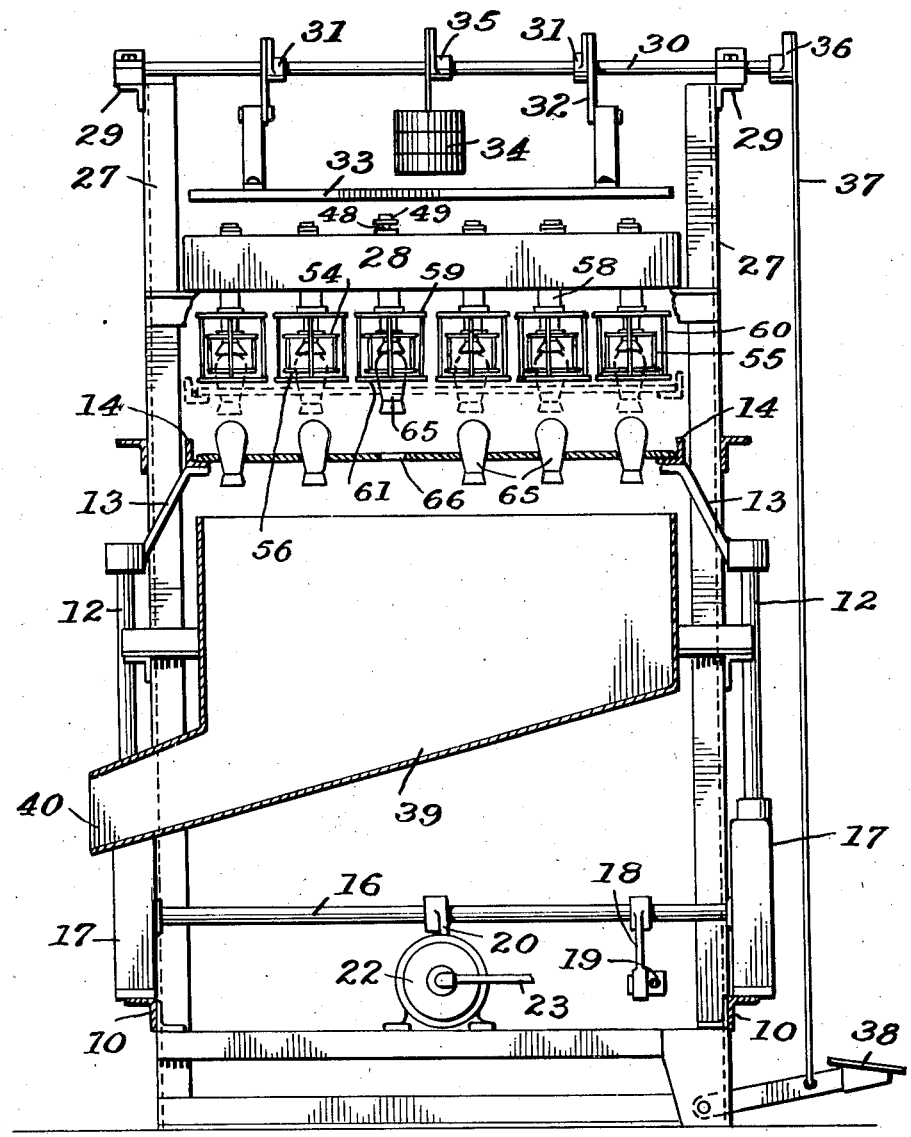
Fig. 2 is a transverse sectional view taken on the line 2—2 of Fig. 1.

Referring to the drawings in detail, a frame 10, forming a support for spaced parallel track rails 11, is provided with vertically slidable rods 12 which support at their upper ends brackets 13 to the ends of which are secured rail sections 14. The lower ends of the rods 12 are connected to levers 15 which are secured adjacent the ends of shafts 16. These in turn are mounted for rotation in suitable brackets 17 and extending downwardly from each shaft 16, intermediate its end, is an arm 18. These arms are connected together by means of a suitable connecting rod 19 so that when the shaft at one end of the apparatus is rotated, the shaft at the opposite end will move in unison. In order to supply motive power for rotating the shafts, a lever arm 20 is secured intermediate the ends of one of the shafts 16 and is connected by means of a link 21 to the piston of an air cylinder 22. This cylinder 22 is connected by means of a pipe 23 through a valve 24 with an air pressure supply line 25 and an exhaust line 26. Thus it will be seen that the movements of the piston may be controlled by manipulation of the valve 24 and hence the raising and lowering movements of the track sections 14 may be readily accomplished. It is to be understood that when the track sections 14 are in their lowermost position, they will align with the track sections 11 so that carrier trays moving along the track sections 11 will readily enter upon the track sections 14.

Supported on the frame 10 and extending upwardly therefrom are standards 27 supporting intermediate their ends a vacuum chest 28 and connecting the upper ends of the standards 27 are cross pieces 29 which support bearings in which a transversely extending shaft 30 is rotatably mounted. A lever 31 is secured intermediate the ends of the shaft and suspended from the free end of said lever is a link 32 which supports at its lower end a plate 33 of a size to substantially cover the entire area of the vacuum chest 28. A weight 34 is suspended from an arm 35 which is attached to the shaft so as to counter-balance the weight of the plate 30 and its accompanying supporting elements. An arm 36 projects from the end of the shaft 30 at the front side of the device in the direction of and parallel with the lever 31 and this arm is connected by means of a suitable tie rod 37 to a treadle 38 which is positioned for convenient operation from the front side of the device.

The frame 10 supports, immediately beneath the vacuum chest 28, a cullet receptacle 39 whose upper edge is below the level of the track sections 14. This cullet receptacle 39 is provided with a chute 40 for directing its contents toward the rear of the device.

Figure 3:
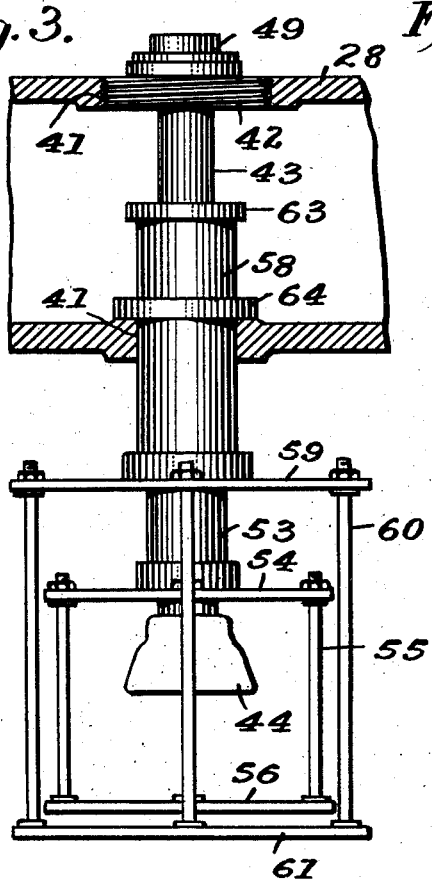
Fig. 3 is an enlarged sectional view through the vacuum chest showing one of the gauges in elevation.
Figure 4:
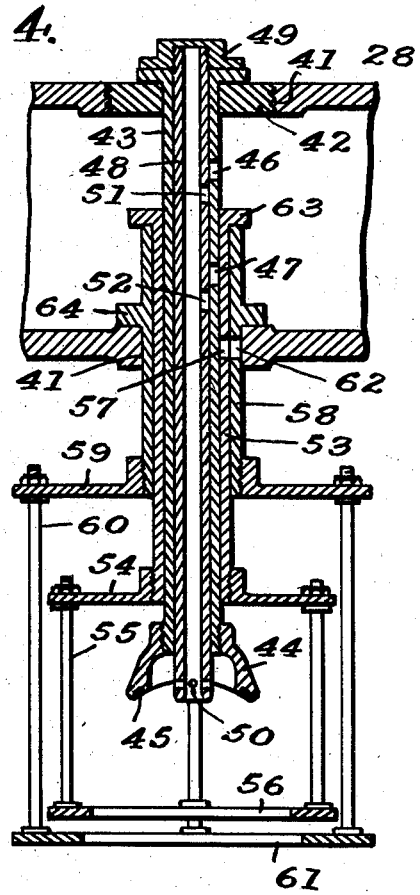
Fig. 4 is a view similar to Fig. 3 showing the gauge in section to illustrate the position of the sleeves and ports when at rest.
Figure 4:
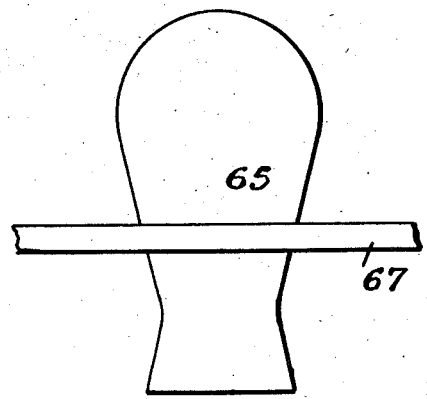
Figure 4:
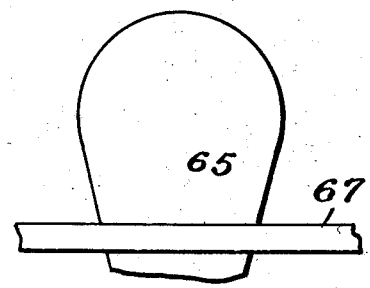

The gauging devices employed are best illustrated in Figs. 3 to 7 inclusive and will now be described in detail.

Formed in the upper and lower walls of the vacuum chest at uniformly spaced intervals are aligning openings 41 in the former of which are fitted bushings 42 which cooperate with the openings in the lower wall in forming guides for the gauges and associated elements as will be readily understood upon reference to the drawings. The openings 41 in the lower wall are of greater diameter than the openings in the bushings 42 so as to accommodate sleeve valves which are controlled by the movements of the gauges as will be hereinafter described. Extending through the openings 41 and bushings 42 is a sleeve 43 which carries at its lower end a cup member 44, the edge of which is grooved to receive a relatively soft packing 45 for engagement with the articles to be gauged in order to form a vacuum tight joint between the surface of the article and the edge of the cup. The sleeve 43 is also provided near its upper end with a port 46 through which under certain conditions communication is established between the vacuum chest and the cup 44. A similar port 47 is formed in the sleeve 43 near the opening 46 for establishing communication under certain other conditions between the vacuum chest and the cup 44. Slidably mounted within the sleeve 43 is a tubular valve 48 which is provided at its upper end with a cap 49 for limiting its downward movement. The lower end of the valve is open and formed adjacent its lower end are radial passages 50 for establishing communication between the interior of the valve and the vacuum cup when the valve is in contact with an article being gauged. Ports 51 and 52 are formed in the valve 48 for alignment under certain conditions with the ports 46 and 47. Surrounding the sleeve 43 and extending through the opening in the bottom wall of the chest 28 is a sleeve 53 which carries at its lower end a bracket 54. The latter supports depending arms 55 which carry at their lower extremities a suitably shaped gauge member 56. Like the sleeve 43, the sleeve 53 is provided with a port 57 which under certain conditions aligns with the ports 47 and 52 to aid in establishing communication between the vacuum chest 28 and the vacuum cup 44. Surrounding the sleeve 53 is a sleeve 58 carrying at its lower end a bracket 59 which supports depending arms 60 carrying at their lower ends a suitably shaped gauge member 61. Like the sleeve 53, the sleeve 58 is formed with a port 62 which normally aligns with the port 57. The alignment of these ports is preserved by the engagement of a stop flange 63 which is carried by the sleeve 53 with the upper end of the sleeve 58 while the downward motion of the sleeves 53 and 58 is restricted by means of a stop flange 64 carried by the sleeve 58. It will thus be seen that when the sleeves 53 and 58 are in their lowermost position, the ports 57 and 62 will align with each other but do not communicate with the vacuum chest nor with the interior of the valve 48.

The articles to be gauged, such as lamp bulbs 65, are supported in openings 66 formed in a suitable carrier such as a tray 67 which is moved along the track rails 11 and advanced onto the rail sections 14. Upon reaching this position air is admitted to the cylinder 22 causing the rail sections 14 to move upwardly and elevate the tray so as to advance the bulbs into contact with the lower edges of the valves 48, thus moving the latter to the position illustrated in Figs. 5 to 7 inclusive. The elevation of the valves 48 moves the ports 51 into alignment with the ports 46 and thereby under certain conditions establishes communication between the vacuum chest 28 and the cup 44.

In Fig. 5 I have illustrated the relative position of the parts when an undersized bulb is encountered and the operation is as follows. As the bulb 65 advances toward the valve 48, it will pass harmlessly through the gauges 56 and 61 and allow the sleeves 53 and 58 to remain motionless. Further upward movement of the bulb will cause it to encounter the lower end of the valve 48 and move the port 51 into alignment with the port 46 thereby establishing communication between the chest 28 and cup 44 so that upon lowering the tray the bulb will be left suspended in the gauge.

In Fig. 6 I have illustrated the relative position of the parts when a bulb of standard size is advanced into a gauge. As the bulb advances upwardly, it encounters gauge 56 which being too small to allow the passage of the article through it causes the sleeve 53 to move upwardly and cover the port 46 so that when the upper end of the bulb contacts with the lower end of the valve 48 and moves the ports 46 and 51 into alignment, evacuation of the cup 44 will be prevented. Thus it will be seen that no vacuum is created within the cup 44 and when the tray is lowered the bulb will remain in position in it.

As shown in Fig. 7 when an oversized bulb is advanced toward the valve 48, the gauge 61 moves upwardly and due to the engagement of the stop flange 63 with the upper end of the sleeve 58 both sleeves will move simultaneously. Since the ports 57 and 62 are normally in alignment and since the sleeves move in unison, the relation of the ports 57 and 62 remain unchanged throughout such upward movement. As the bulb advances, the valve 48 is elevated to bring the ports 47 and 52 into alignment with the ports 57 and 62 and thereby establish communication between the vacuum chest 28 and the interior of the valve 48 to evacuate the cup 44. Hence the bulb will be held against the influence of gravity when the tray 67 is lowered and moved off of the rail sections 14.

The release of the irregular bulbs, after the removal of the tray, is accomplished by exerting downward pressure on the treadle 38. This causes the plate 33 to engage and press upon the caps 49 so as to force the valves 48 downwardly. The downward movement of the valves forcibly ejects the bulbs and also moves the ports out of alignment thereby breaking the vacuum and preventing waste of energy.

By the term "gauge" as herein used, I mean a gauging device which consists of one or more gauging elements.

While in the foregoing I have shown and described the preferred embodiment of my invention, it is to be understood that minor changes in the details of construction, combination and relation of parts, such as the advancing of the gauges toward the articles to be gauged, or the use of a single gauging device by which only one article is gauged at a time, may be resorted to without departing from the spirit and scope of the invention as claimed.

I claim:

1. In a gauge an article retaining member, means for energizing the article retaining member when an article is presented to it, and an article engaging and embracing member associated with the article retaining member for rendering the energizing means inoperative when an article of predetermined size and shape is presented to it.

2. In a gauge an article retaining member, means for energizing the article retaining member upon presenting an article to it, an article embracing member associated with the article retaining member, and an article engaging member associated with the article retaining member, said last named cooperating with the energizing means for rendering the latter inoperative when an article conforming to a predetermined size and shape is presented to the article retaining member.

3. In a gauge an article retaining member, means for energizing the article retaining member when an article is presented to it, an article engaging and embracing member associated with the article retaining member for rendering the energizing means inoperative when an article of predetermined size and shape is presented to it, and means for releasing articles which have been retained by the article retaining member.

4. In a gauge an article retaining member, means for energizing the article retaining member upon presenting an article to it, an article embracing member associated with the article retaining member, an article engaging member associated with the article retaining member, said last named member cooperating with the energizing means for rendering the latter inoperative when an article conforming to a predetermined size and shape is presented to the article retaining member, and means for releasing articles which have been retained by the article retaining member.

5. In a gauge a normally inoperative article retaining member, means for presenting articles to the article retaining member and article operated means for rendering the article retaining member operative when an article of irregular size or shape is presented to it.

6. In a gauge a normally inoperative article retaining member, means for presenting articles to the article retaining member, article operated means for rendering the article retaining member operative when an article of irregular size or shape is presented to it, and means for releasing articles which have been retained by the article retaining member.

7. In a gauge, a vacuum cup, means for energizing the vacuum cup upon presenting an article to it, and an article embracing member associated with the vacuum cup and cooperating with the energizing means to render the latter inoperative when an article greater than a predetermined size is presented to the vacuum cup.

8. In a gauge a vacuum chest having an opening in one wall, a tubular sleeve slidable through the opening, said sleeve having a port adapted to communicate with the interior of the chest, a vacuum cup at one end of the sleeve, a sleeve surrounding the first named sleeve and slidable with relation thereto, said last named sleeve being slidable through the opening in the vacuum chest, said last mentioned sleeve having a port adapted to align with the port in the first named sleeve, and an article gauging member on the last named sleeve.

9. In a gauge a vacuum chest having an opening through which a plurality of nested sleeves having ports are slidable, a vacuum cup at one end of one of said sleeves and gauges on the other sleeves for causing the ports to align and establish communication between the chest and vacuum cup when an article of irregular size or shape is presented to the vacuum cup.

10. In a gauge a vacuum chest having an opening in one wall, a tubular sleeve slidable through the opening, said sleeve having a port adapted to communicate with the interior of the chest, a vacuum cup at one end of the sleeve, a sleeve surrounding the first named sleeve and slidable with relation thereto, said last named sleeve being slidable through the opening in the vacuum chest, said last mentioned sleeve having a port adapted to align with the port in the first named sleeve, an article gauging member on the last named sleeve and means for presenting an article to the vacuum cup.

11. In a gauge a vacuum chest having an opening through which a plurality of nested sleeves having ports are slidable, a vacuum cup at one end of one of said sleeves, gauges on the other sleeves for causing the ports to align and establish communication between the chest and vacuum cup when an article of irregular size or shape is presented to the vacuum cup and means for presenting an article to the vacuum cup.

DAVID E. GRAY.